United States Patent
Perunka et al.

(10) Patent No.: US 12,487,002 B2
(45) Date of Patent: Dec. 2, 2025

(54) ELEVATOR-BASED AIR QUALITY SENSING SYSTEM FOR BUILDINGS

(71) Applicant: KONE Corporation, Helsinki (FI)

(72) Inventors: Pekka Perunka, Helsinki (FI); Pekka Perälä, Helsinki (FI)

(73) Assignee: KONE CORPORATION, Helsinki (FI)

( * ) Notice: Subject to any disclaimer, the term of this patent is extended or adjusted under 35 U.S.C. 154(b) by 539 days.

(21) Appl. No.: 17/962,300

(22) Filed: Oct. 7, 2022

(65) Prior Publication Data

US 2023/0032412 A1 Feb. 2, 2023

Related U.S. Application Data

(63) Continuation of application No. PCT/EP2021/060510, filed on Apr. 22, 2021.

(30) Foreign Application Priority Data

May 4, 2020 (EP) ..................................... 20172711

(51) Int. Cl.
  *F24F 11/89* (2018.01)
  *B66B 1/34* (2006.01)
  (Continued)

(52) U.S. Cl.
  CPC ............ *F24F 11/89* (2018.01); *B66B 1/3461* (2013.01); *B66B 1/3492* (2013.01);
  (Continued)

(58) Field of Classification Search
  CPC ........ F24F 11/89; F24F 11/52; F24F 2110/10; F24F 2110/20; F24F 2110/40;
  (Continued)

(56) References Cited

U.S. PATENT DOCUMENTS 10,875,744 B1 * 12/2020 Doyle ................ B01D 46/0028
2009/0038473 A1 * 2/2009 Kwon ....................... B03C 3/68
  95/3
(Continued)

FOREIGN PATENT DOCUMENTS

CN 208394574 U * 1/2019
CN 109761131 A 5/2019
(Continued)

OTHER PUBLICATIONS

Karakitsios, S., Busker, R., Tjärnhage, T., Armand, P., Dybwad, M., Nielsen, M.F., Burman, J., Burke, J., Brinek, J., Bartzis, J. and Maggos, T., 2020. Challenges on detection, identification and monitoring of indoor airborne chemical-biological agents. Safety Science, 129, p. 104789. (Year: 2020).*

(Continued)

*Primary Examiner* — Alicia M. Choi
(74) *Attorney, Agent, or Firm* — Birch, Stewart, Kolasch & Birch, LLP

(57) ABSTRACT

A method of monitors a climate quality within a building having an elevator running between floors of an elevator hoistway. The elevator car of the elevator includes at least an air-quality sensor. The method is characterized in that a fan of the elevator car is running when the door(s) of the car is/are opening at a floor station to suck air from the building's floor level into the elevator car to the vicinity of the air-quality sensor and sensing the air-quality by the sensor preceding to generating data of the air-quality.

20 Claims, 2 Drawing Sheets

Figure 1:
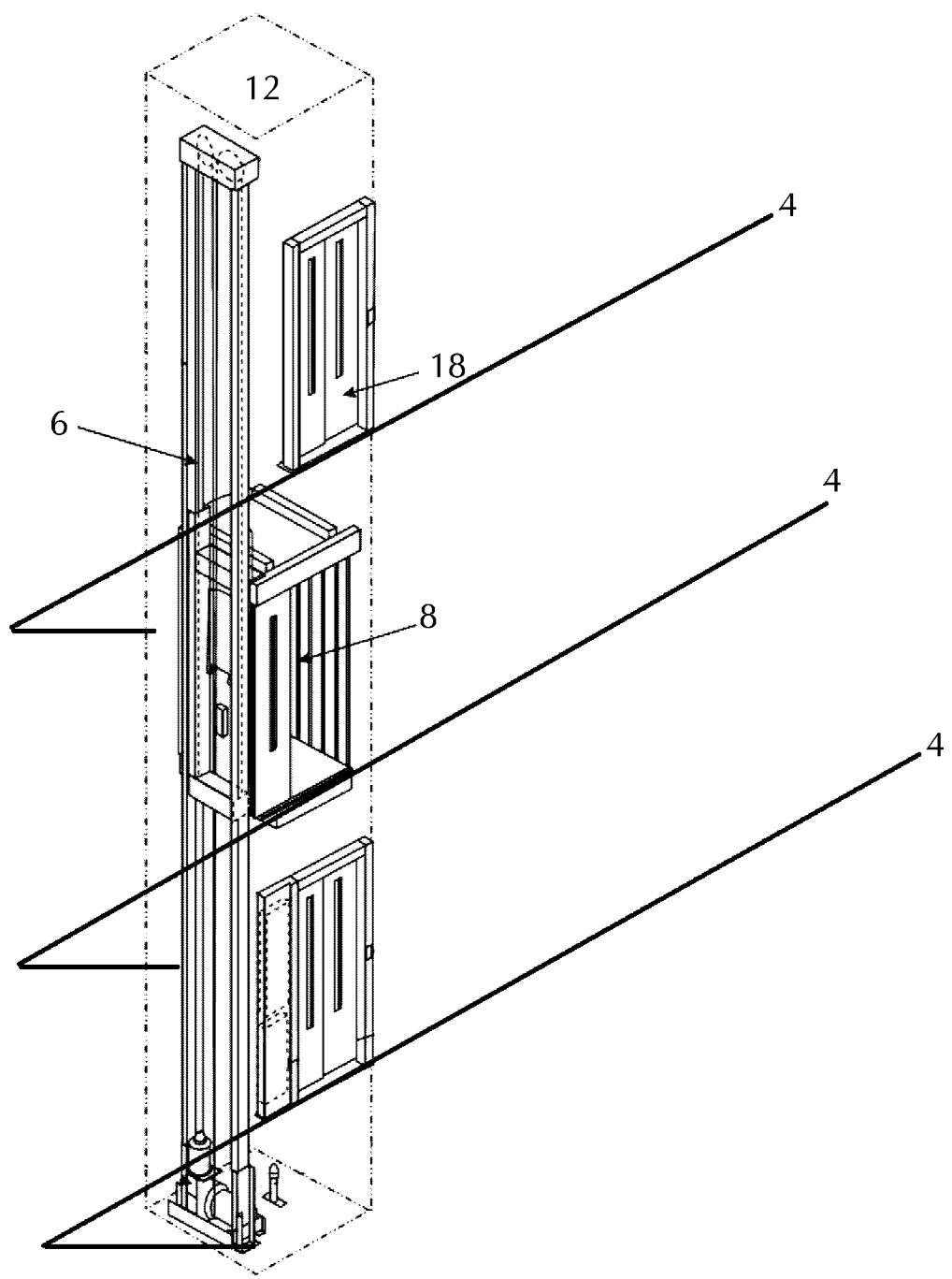

(51) Int. Cl.
    *B66B 11/02*     (2006.01)
    *F24F 11/52*     (2018.01)
    *G05B 19/042*     (2006.01)
    *F24F 110/10*     (2018.01)
    *F24F 110/20*     (2018.01)
    *F24F 110/40*     (2018.01)
    *F24F 110/50*     (2018.01)

(52) U.S. Cl.
    CPC ............ *B66B 11/024* (2013.01); *F24F 11/52* (2018.01); *G05B 19/042* (2013.01); *F24F 2110/10* (2018.01); *F24F 2110/20* (2018.01); *F24F 2110/40* (2018.01); *F24F 2110/50* (2018.01); *F24F 2221/50* (2013.01); *G05B 2219/2614* (2013.01)

(58) Field of Classification Search
    CPC ............... F24F 2110/50; F24F 2221/50; F24F 11/0001; B66B 1/3461; B66B 1/3492; B66B 11/024; G05B 19/042; G05B 2219/2614; Y02B 30/70; Y02B 50/00
    See application file for complete search history.

(56) References Cited

U.S. PATENT DOCUMENTS

| | | | |
|---|---|---|---|
| 2018/0009638 A1* | 1/2018 | Fargo | G02B 6/0008 |
| 2018/0283727 A1* | 10/2018 | Grabon | B66B 11/00 |
| 2021/0395044 A1* | 12/2021 | Lee | B08B 5/02 |

FOREIGN PATENT DOCUMENTS

| | | | |
|---|---|---|---|
| CN | 210366536 U | * | 4/2020 |
| JP | 2-265889 A | | 10/1990 |
| JP | 07247060 A | * | 9/1995 |
| JP | 2014-40303 A | | 3/2014 |
| KR | 101653664 B1 | * | 9/2016 |

OTHER PUBLICATIONS

European Search Report, issued in EP Application No. 20 17 2711 dated Oct. 16, 2020.

International Search Report for PCT/EP2021/060510 mailed on Jun. 15, 2021.

Written Opinion of the International Searching Authority for PCT/EP2021/060510 mailed on Jun. 15, 2021.

* cited by examiner

ELEVATOR-BASED AIR QUALITY SENSING SYSTEM FOR BUILDINGS

CROSS REFERENCE TO RELATED APPLICATIONS

This application is a Continuation of PCT International Application No. PCT/EP2021/060510, filed on Apr. 22, 2021, which claims priority under 35 U.S.C. 119 (a) to patent application No. 20172711.2, filed in the Europe on May 4, 2020, all of which are hereby expressly incorporated by reference into the present application.

FIELD OF THE INVENTION

The present invention relates in general to the field of elevator technology. The present invention further constitutes a bridge to the field of process technology for house systems dealing with climate items like heating, ventilation or air conditioning. Such house systems can encompass automation systems known for example as HVAC-systems (Heating, Ventilation and Air Conditioning).

BACKGROUND OF THE INVENTION

Modern buildings are increasingly equipped with indoor air quality monitoring devices, since indoor air quality is an uprising important factor to declare buildings being sustainable and healthy. This is visible both on the regulatory level as well as in consumer's demand. For example, health and well-being is recognized as one of the critical impact areas under EU's Smart Readiness Indicator (SRI) for buildings. On the customer side, people are increasingly aware of the dangers of poor indoor air quality. This is especially evident in emerging markets with major air pollution issues. So, monitoring, predicting and controlling indoor air quality are important drivers to achieve the expected impact on sustainable and healthy buildings. However, these systems often are limited to commercial buildings in which the business case for distributing sensors and providing necessary connectivity can be justified more easily. Residential buildings arguably face similar issues with indoor air quality but innovations are required to bring the investment cost in required infrastructure down.

Traditional indoor air monitoring is carried out by installing fixed sensors at each monitored location, wherein data of such sensors are communicated by wiring or wirelessly to a centralized data acquisition controller of an HVAC-system that takes care of adapting the climate in the building accordingly. Some architectures also utilize direct mobile connectivity from the sensor devices without centralized data collection in the building.

AIM OF THE INVENTION

It is an object of the present invention to improve the climate condition in a building including an elevator system.

SUMMARY OF THE INVENTION

The above object is achieved by a method according to claim 1. A respective system realizing the method is claimed in claim 14. Advantageous embodiments are disclosed in the respective subclaims.

Basic idea of the invention is to use an elevator as an indoor climate quality monitoring hub for the building as a whole. Therewith, the elevator car can be integrated as a measuring component into an HVAC-system of the building.

In general, the inventive concept lies in the idea of moving the elevator car between building floors, acquiring data of the building climate when the car doors are open, pairing the data with the floor information available by means of a position detection of the car and sending the data to certain external devices. For this reason, the elevator car is at least equipped with an air-quality sensor.

However, the following measurement data could be gathered by the indoor climate quality monitoring by means of the elevator according to the invention, wherein a respective convenient sensor is installed and used:

Temperature
Humidity
Air Pressure
VOC (Volatile Organic Compounds)
PM2.5/PM10 (small particles of air pollution)
Floor level noises
Smells (what is a common issue in residential buildings).

When referenced to noise sensing, there is no need to suck air in and the noise level of a respective floor can be recorded when installing the respective sensor at a convenient cabinsite.

As regards the position detection of the car within the hoistway one can retrieve the position of the car with reference to a floor level by providing the elevator car with a magnetic sensor that is functionally linked to a sensing magnet strip in the hoistway or vice versa. The control unit then processes the data as gained by the sensor to indicate the floor level the car is actually positioned at. The strip is equipped with the typically magnetic coding, and by reading these codes the system is able to carry out an appropriate position determination. Another method for getting the landing information is realized with the help of limit switches at the elevator car interacting with triggering devices in the shaft (or vice versa) such that the elevator triggers those switches when it is standing exactly at the landing. At least, another alternative for getting landing information is to attach a distance measurement sensor such as a laser position sensor or an ultrasound transducer and to utilize distance information provided by that sensor for detecting which landing the elevator is at. Motor control is another example scenario to determine the car position. The position information regarding motor components is useful for either controlling the motor itself, but it is also useful for determining positions of other components that move responsive to an operation of the motor. At least, one can get the landing information of an elevator car by analysing signals which can be produced by very low-cost add-on sensors as for example accelerometer devices that can be mounted at car site. These ones can also be combined with a sensor solution providing open/closed status information about the car door or the car doors to then verify the respective floor level. By means of such add-on sensors it is conveniently possible to modernize existing elevator systems with the present invention to improve the climate control by means of using the elevator plant.

According to the invention, it was recognized that an elevator as a moving unit through a building is well suited to collect data on the climatic condition of the building. Linking the elevator system with the building's HVAC-system can make the adaption of the climate in the building more effective. The elevator car shows an inherent capability to move vertically for providing measurement samples on every floor that the elevator serves. This means one sensor hub instead of several sensors on every floor. Therewith, the elevator can gather climate data during its normal operation.

The invention solves to diminish investment costs for an indoor climate quality monitoring also in multitenant residential buildings. The traditional way of distributing sensors and connectivity to multiple floors (up to 30+ floors) in residential buildings becomes cost prohibitive, and as a result, investments are held down. When considering the costs of proper air quality sensing devices that range from 100's up to 1000's of Euros, it is clear that the installation of such devices on each floor becomes very expensive. Additionally, installing/maintaining the devices and providing wiring or wireless connectivity to these devices further increase the costs. Further, existing edge devices and gateways for the elevator condition monitoring can be leveraged for data-processing and connectivity to minimize the costs.

The invention describes an elevator on-board climate quality monitoring hub that is configured to take measurement samples at each floor that the elevator stops at. The climate quality sensor(s) can be installed inside the elevator car ceiling or other convenient location at the elevator cabin site. The elevator is configured to utilize its ceiling fan to push cabin air from inside the cabin to the outside into the elevator shaft and to therewith circulate air from a landing floor into the cabin during a stop when the door(s) are open or at least in an opening mode. The ceiling fan thus is creating a pressure differential between the cabin space and the space of the landing floor, thus causing an air current to flow into the cabin from the landing space. The elevator stop times and door opening/closing times can be adjusted to enable sufficient air intake during a stop so that the response time—how long it takes to get a proper measurement sample—of particularly an air quality sensor is taken into account. Time and car position, especially on a floor level, are recorded for each measurement. This enables to allocate the measured data of the sensor to the floor at which the car was stationed with open doors. Such mapping of the climate data to the position of where the car has been during acquiring the climate data creates a climate image across the entire building.

Mapping of the correct climate to a specific floor can be improved according to a preferred embodiment in case of pairing the sensed data to that floor level at which the doors have been last opened. Therewith the sensing time is prolonged for a better verification of the data even when the car is leaving that floor or when closing the door. Such a sensing cycle can be carried out for that floor until the car doors reopen on a different floor. As an embodiment, the sensing step can be continuously carried out even when the car is moving until the door is reopened on a next floor level.

Beside this aspect, the fan can be synchronized with the car-door-open action. The fan is then switched on by a controller, i.e. the door controller or the elevator controller, simultaneously to an opening action of the car door and switching the fan off when closing the door. Alternatively, to the above long-time-cycle of measurement, it is possible to sense the climate data only during a running action of the fan.

Alternatively, it is possible to that a sensing cycle is started only after a time-lapse of a preset time delay that is started after the door has been opened. This enhances a correct mapping of the climate data to the floor, the car actually is positioned at, since the sensing starts after that time delay at which it is probable that the air as sucked in by the fan actually has reached the sensor. This measure depends on where the sensor is installed at the car site and also from the capacity of the fan. The more air a fan can circulate, the faster is the air sucked in the vicinity of the sensor and the shorter the time delay can be chosen.

Further, in residential buildings an elevator car often remains idle on a floor level for long periods of time and this can be utilized for performing a sensing cycle, in which the elevator travels without transporting passengers but stops at every floor to take a measurement sample. This embodiment includes the step of notifying by the elevator controller whether a further passenger-call is pending and if not, performing then the above step of sensing the floor-level climate by means of an empty car.

Alternatively, there can be a stopping of a time window within which a measuring of sensing any climate parameter was missing. Then, a threshold value for a time window in which the elevator wasn't used to sense the climate quality can be defined and laid down at a controller. The exceedance of said threshold value then can trigger a measuring cycle or at least can list such measuring cycle as a to-do-step to perform the control method as soon as it can be conveniently done. This step can be also implemented for each floor level independently, meaning that a time window threshold value is set for each floor level indicating whether a sensing cycle has been performed on a specific floor or not. The exceedance of a threshold linked to a specific floor would then trigger a sensing action for the specific floor only.

As an alternative, the elevator can be configured to perform the measurements only during its normal operation so that there is no impact on elevator running time or energy consumption. This approach should give at least few daily data points for each floor in the building.

At least, according to an embodiment of the invention, the elevator controller is configured such to control the method by predetermined programming. This means that the elevator controller is responsible to carry out or start the method with the inclusion of moving the elevator car from floor to floor and opening the door at each floor, respectively to collect data about the climate on each specific floor level.

The inventive method can run as follows:
1. An elevator car stops at a landing floor. If passengers want to exit or enter into the cabin, the doors will be opened on demand by the passenger(s).
2. The controller of the elevator can be configured such that the door(s) remain(s) opened in response to a sensing requirement. Such a sensing requirement can be triggered by the elevator controller or by an extern HVAC-controller of the building. It can be also triggered by a mobile smart-gadget that is linked to the elevator control.
3. In case there is no passenger to be served, the controller of the elevator can be configured such that the doors will be opened solely because of a measuring demand to take a measurement sample.
4. A ceiling fan is switched on by the elevator controller to blow out air until air properties inside the elevator car are the same as on the building floor. Air intake time should be preferably less than 60 s with a car size of 2-4 $m^3$ and a typical ceiling fan of 2-4 $m^3$/min capacity.
5. The air quality sensor takes one or more measurement samples and data can pre-processed on a local machine.
6. In case of a present noise-sensor, data can be recorded continuously
7. Any pre-processed data can be dispatched to a cloud platform via field gateway (Data Transmission Unit (DTU)).
8. These data can be shared by the HVAC-system of the building.

According to an advantageous embodiment, the climate quality monitoring data can be combined with a building model (BIM-model) to create visualizations for end users. According to another embodiment, the data can be also used to provide alarms to a facility management company if indoor climate deviates from optimal values.

The data as taken by the sensing arrangement localized at the cabin site of the elevator can be sent in an intermediate step or as an independent additional step to the elevator controller or a remote server or a cloud computing unit or any other external device for processing or visualizing the sensed data. This can support for example any analysis to prepare the data in a suitable way for the HVAC controller. This can also mean an advantageous communication when sending the data to a mobile gadget like smart phones or an iPad to communicate the data or to visualize them on a screen.

After the transmission of the climate data to the HVAC-system controller of the building, the HVAC control unit of the building can take measures to adapt, i.e. improve the climate in the building. This includes, for example, opening ventilation flaps or switching on an air cleaning system, or switching on/off an air conditioning system.

Figure 2:
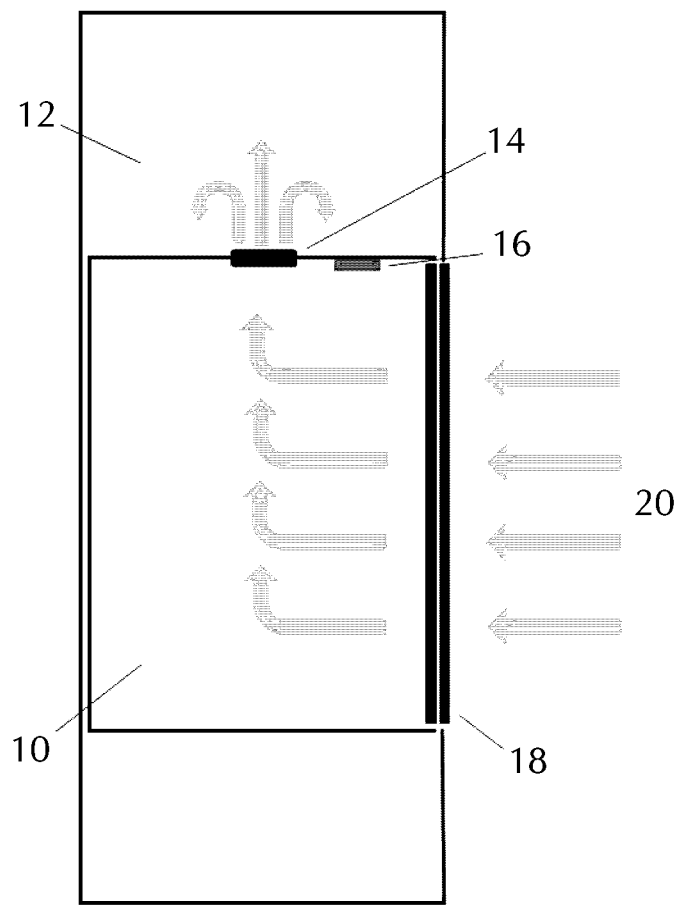

In the following, the invention is elucidated by means of an embodiment shown in the drawings. In these, FIG. 1 is a perspective view of an elevator moving in its hoistway;

FIG. 2 is a schematic view showing the functioning of the invention

In FIG. 1 an elevator system is to be seen serving several floor levels 4. In the middle floor level there is an elevator car 10 stopping with car doors 18 opened so that the inner space 8 of the car 10 is in air exchange with the air of the respective floor level 4. Any data which are gained or sent to the car are transmitted via a cable 6 to the controller of the elevator system.

When now having a look into FIG. 2, the invention becomes clear in view of that when the car doors 18 are opened, at least then, the fan 14 in the ceiling of the elevator car 10 is triggered to be switched on. This in turn leads to that the air of inside the car is ventilated and pushed into the hoistway 12, what also leads to that air of the floor level 4 is sucked into the cabin of the car creating therewith an air flow 20 into it. Since this air flow 20 continues up to the fan 14 and further on into the hoistway space, the air flow 20 is directed to the air quality sensor 16 which is creating data of the quality of the air as sucked in from the floor level 4. These data can be sent via the cabling 6 to the elevator controller for any further evaluation. When integrating these data into the building automation any ventilation of air within the building can be adapted by the data as gathered by the quality sensor 16 within the car 10. Due to that the car is moving between the several floors 4, it is an easy way to gather air quality data from each floor level 4 by means of the moving car.

The invention claimed is:

1. A method of controlling a climate quality within a building by means of an elevator system comprising an elevator controller and an elevator car that is running between floors of an elevator hoistway of the building, the elevator car of the elevator comprising at least an air-quality sensor, the method comprising the steps of:
controlling a fan of the elevator car to at least run when at least one door of the elevator car is detected to be open or opening at a floor level station to therewith suck air from a building's floor level into the elevator car to a vicinity of the sensor; and
sensing at least one sensor specific parameter by the air-quality sensor,
wherein a floor-level-position of the elevator car is further detected and the at least one sensor specific parameter is allocated to the floor-level-position data of the elevator car as gained by the position detection to obtain a floor level specific climate data.

2. The method according to claim 1,
wherein when the at least one door of the elevator car is open, a floor level is verified from the floor-level-position data of the elevator car, wherein the acquired at least one sensor specific parameter is allocated to said verified floor level as long as the at least one door will be opened again on a different floor level.

3. The method according to claim 1,
wherein the fan is switched on by a controller simultaneously when starting an opening process of the at least one door of the elevator car, and is switched off when closing the at least one door, wherein climate data is sensed only while running the fan.

4. The method according to claim 1,
wherein sensing of the at least one sensor specific parameter starts after a time-lapse of a preset time delay.

5. The method according to claim 1,
wherein sensing of the at least one sensor specific parameter is only carried out when the elevator car is empty.

6. The method according to claim 1,
further comprising sending the floor level specific climate data as acquired for each floor level to a mobile smart-gadget visualizing therewith climate conditions within the floor levels of the building.

7. The method according to claim 1,
further comprising sending the acquired floor level specific climate data to a controller linked to an HVAC-system of the building for further processing said floor level specific climate data and adapting the climate quality accordingly.

8. The method according to claim 1, further comprising:
measuring the climate quality, including measuring, by means of a corresponding sensor, temperature, humidity, air pressure, volatile organic compounds, small particles of air pollution, or floor level noises.

9. The method according to claim 1,
further comprising:
monitoring a time elapsed since the last sensor specific parameter was sensed; and
triggering an activation of the step of controlling the fan when said time exceeds a predetermined threshold.

10. The method according to claim 9,
wherein said time elapsed since the last sensor specific parameter was sensed is monitored individually for each floor, so that the activation of the step of controlling the fan is performed individually for each floor level.

11. The method according to claim 1, further comprising:
sensing further data by an air quality sensing system installed in the building; and
combining said further data with the floor level specific climate data.

12. The method according to claim 1,
wherein the elevator controller receives and/or exchanges commands with an HVAC-controller of the building.

13. The method according to claim 1,
wherein the elevator controller is configured to start the controlling of the fan including a travel action of the elevator car moving from floor to floor and opening the at least one door at each floor, respectively.

14. An elevator system including the elevator controller and the elevator car, wherein the elevator controller is configured to carry out the method according to claim 1.

15. The method according to claim 2,
   wherein sensing of the at least one sensor specific parameter starts after a time-lapse of a preset time delay.

16. The method according to claim 3,
   wherein sensing of the at least one sensor specific parameter starts after a time-lapse of a preset time delay.

17. The method according to claim 2,
   wherein sensing of the at least one sensor specific parameter is only carried out when the elevator car is empty.

18. The method according to claim 3,
   wherein sensing of the at least one sensor specific parameter is only carried out when the elevator car is empty.

19. The method according to claim 4,
   wherein sensing of the at least one sensor specific parameter is only carried out when the elevator car is empty.

20. The method according to claim 2,
   further comprising sending the floor level specific climate data as acquired for each floor level to a mobile smart-gadget visualizing therewith climate conditions within the floor levels of the building.

\* \* \* \* \*